(12) United States Patent
Mueller et al.

(10) Patent No.: US 11,043,798 B2
(45) Date of Patent: Jun. 22, 2021

(54) METHOD FOR THE OPERATIONALLY SAFE ACTIVATION OF AT LEAST ONE ELECTRONIC COMPONENT

(71) Applicant: Robert Bosch GmbH, Stuttgart (DE)

(72) Inventors: Bernd Mueller, Leonberg (DE); Mateusz Marszalski, Tokyo (JP); Sandra Hermoso Peralo, Stuttgart (DE); Uwe Beutnagel-Buchner, Stuttgart (DE); Wolfgang Kostorz, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 126 days.

(21) Appl. No.: 16/429,391

(22) Filed: Jun. 3, 2019

(65) Prior Publication Data
US 2019/0379199 A1 Dec. 12, 2019

(30) Foreign Application Priority Data
Jun. 7, 2018 (DE) .......................... 102018208994.9

(51) Int. Cl.
*H02H 1/00* (2006.01)
*H02H 5/04* (2006.01)
*G01K 3/00* (2006.01)

(52) U.S. Cl.
CPC .......... *H02H 1/0092* (2013.01); *G01K 3/005* (2013.01); *H02H 5/04* (2013.01)

(58) Field of Classification Search
CPC ............................... H02H 1/0092; H02H 5/04
See application file for complete search history.

(56) References Cited

U.S. PATENT DOCUMENTS

| | | | |
|---|---|---|---|
| 2014/0293487 A1* | 10/2014 | Yamamoto | H02H 5/04 361/1 |
| 2015/0290373 A1* | 10/2015 | Rudser | A61M 1/1086 623/3.27 |
| 2016/0315464 A1* | 10/2016 | Furuto | H02H 5/04 |
| 2017/0167492 A1* | 6/2017 | DeFilippis | F04D 27/008 |
| 2018/0069393 A1* | 3/2018 | Iwata | H02H 5/044 |
| 2018/0244165 A1* | 8/2018 | Anma | B60L 3/00 |
| 2018/0366791 A1* | 12/2018 | Kondo | H01M 10/425 |

* cited by examiner

*Primary Examiner* — Kyle J Moody
(74) *Attorney, Agent, or Firm* — Norton Rose Fulbright US LLP; Gerard Messina

(57) ABSTRACT

A method for providing operationally safe activation of at least one electronic component in a system, a start process of the system being initiated, a decision logic being activated, at least one temperature sensor being read out by the decision logic, the decision logic, based on the measured temperature of the at least one temperature sensor, checking whether the at least one electronic component is activatable in an operationally safe manner, and an activation of the at least one electronic component being initiated by the decision logic, if the temperature measured by the at least one temperature sensor is below a threshold value. A related system is also described.

14 Claims, 2 Drawing Sheets

METHOD FOR THE OPERATIONALLY SAFE ACTIVATION OF AT LEAST ONE ELECTRONIC COMPONENT

RELATED APPLICATION INFORMATION

The present application claims priority to and the benefit of German patent application no. 10 2018 208 994.9, which was filed in Germany on Jun. 7, 2018, the disclosure of which is incorporated herein by reference.

FIELD OF THE INVENTION

The present invention relates to a method for the operationally safe activation of at least one electronic component in a system, as well as a system for carrying out such a method.

BACKGROUND INFORMATION

In the automotive sector, various electronic components are used, in particular, in control units. Such electronic components are used, among other things, for carrying out safety-relevant applications such as, for example, driver assistance systems. Electronic components must be operated within their specifications in order to ensure a trouble-free function. An operation of the components at temperatures that are higher than the specification limits, in particular, may be assessed as critical, since the self-heating of the components may result in a further increase of the operating temperature. Such electronic components may, for example, be microcontrollers or microprocessors.

In many fields of application, reaching an excessive temperature is realistically possible only during operation. During operation, a software-based access to temperature sensors may be enabled, since the electronic component is operated initially within the specification during operation and a drift in the direction of higher temperatures may be noticed in a timely manner.

There are, however, electronic components, for which the starting point in time is particularly critical. In the case of a video control unit installed in a front windshield, for example, a parking situation at a hot and sunlit location may result in an excessive temperature, since then no cooling is possible either by the airstream or by an air conditioning system.

The proper functional efficiency of the electronic component may not be presupposed if an electronic component is started at an excessive temperature, since the operation takes place outside the specifications. In a "worst case" scenario to be assumed, this electronic component may continue to heat up and may trigger a safety-relevant malfunction.

There are approaches in which the electronic component attempts to read electronically coupled temperature sensors also outside the specification, in order to subsequently initiate a turn-off. Such an approach lacks sufficient reliability, however for carrying out safety-critical applications.

SUMMARY OF THE INVENTION

An object underlying the present invention may be considered to be that of providing a method and a system, which ensure a safe power-up of an electronic component even at high ambient temperatures.

This object may be achieved with the aid of the respective subject matter described herein. Advantageous embodiments of the present invention are the subject matter of the respective further descriptions herein.

According to one aspect of the present invention, a method is provided for the operationally safe activation of at least one electronic component in a system.

In one step, a start process of the system is initiated. In this step, a decision logic is activated. At least one temperature sensor is read out by the activated decision logic. Based on the measured temperature of the at least one temperature sensor, the decision logic checks whether the at least one electronic component is activatable in an operationally safe manner. If operationally safe general conditions are ascertained for the at least one electronic component, an activation of the at least one electronic component is then initiated by the decision logic. Such a general condition may be, in particular, a temperature measured by the at least one temperature sensor, which is below a threshold value.

The at least one electronic component may, for example, be a microcontroller, an integrated circuit and the like.

A typical threshold value for the temperature in the core of the electronic component may, for example, be 125° C. This temperature may not be exceeded during operation of the electronic component. The method may prevent the at least one electronic component from being taken into operation above the temperature threshold. In the process, the decision logic may decide, based on measured values, whether the at least one electronic component is turned on or remains in a deactivated state.

After a start of the system, the decision logic itself is activated. This may take place, for example, in the form of an electrical start. The decision logic may optionally carry out various checks. The decision logic may carry out, in particular, a check of temperature values, which are retrievable from one or from multiple temperature sensors. With the decision logic, it may be checked, in particular, whether an error is present in a temperature sensor and whether a temperature ascertained by a temperature sensor is above a threshold value.

On the basis of these checks, a decision may be made in the decision logic whether the at least one electronic component may be started. If yes, then the electronic component is also started; if no, the method is repeated starting from an earlier step. From which step the method is subsequently repeated is a function of which test criterion has been violated. In the case of an excessively high measured temperature, for example, the temperature may be continuously read out again until the temperature is below the threshold value. If an error in the temperature sensor has been determined, for example, the system may be restarted.

The method according to the present invention may enable a safe power-up of at least one electronic component even at high temperatures. This may be safely and reliably carried out even in the event of a defective temperature sensor, since an error check of the temperature sensor takes place. As a result, a system may be implemented, which meets the ISO 26262 Standard.

According to one specific embodiment of the method, in the event the threshold value of the measured temperature of the at least one temperature sensor is exceeded, the activation of the at least one electronic component by the decision logic is suspended until the measured temperature is below the threshold value. If, for example, only the temperature measured by the temperature sensor is too high, then the step is repeated until a sufficient cooling has taken place. In this way, a wait loop may be implemented in the method, which enables a cooling of the electronic component. The decision logic may ascertain and store a temperature curve, thus enabling the ascertainment of a cooling curve and an analysis of a temperature curve.

According to another specific embodiment of the method, a self-test is carried out by the decision logic. In this way, a correct functionality of the decision logic may be checked. This may take place, for example, by checking the temperature or by electrically measuring relevant areas of the decision logic and by a subsequent comparison with setpoint values.

According to another specific embodiment of the method, an electronic test of the at least one component is carried out by the decision logic. With this measure, for example, a resistance measurement or a capacitance measurement of the at least one electronic component may be carried out by the decision logic, in order, for example, to rule out a short circuit or other errors in the strip conductors.

According to another specific embodiment of the method, it is checked by the decision logic whether the at least one temperature sensor exhibits an error. This check may be implemented, in particular, by using one or multiple additional temperature sensors. In this way, an error-free functionality of a temperature sensor may be ensured by a redundant arrangement of temperature sensors.

According to another specific embodiment of the method, a restart of the system is initiated by the decision logic or an error signal is generated in the event an error is detected by the decision logic. If a temperature sensor error is present, the decision logic may the initiate a restart of the system. If after a restart the error is not eliminated, an error message may be generated and, for example, conveyed to an output unit.

According to another specific embodiment of the method, the at least one electronic component is activated in a power saving mode by the decision logic in the event a first threshold value of the measured temperature is exceeded and a second threshold value of the measured temperature is fallen below. Thus, additional intermediate steps for the threshold value of the temperature may be defined, which permit a functionality of the electronic component within the scope of its specification, but which may be rapidly exceeded as a function of a self-heating of the electronic component. With a forced power saving mode, it is possible to reduce the self-heating and to enable a permanent operation of the electronic component within the scope of the specification limits.

According to one alternative embodiment, such a power saving mode is not absolutely necessary. If the self-heating of the component is sufficiently low, even in the normal operating mode or in a so-called "full power mode", this mode may also be used. If the electronic component is activated, the component may access internal temperature sensors within the specification and thus initiate appropriate countermeasures in a timely manner before exceeding the specification limits.

According to another specific embodiment of the method, a self-heating of the at least one electronic component is taken into consideration when the check is carried out by the decision logic.

It is particularly advantageous if the thermal connection of a temperature sensor and of the electronic component is configured in such a way that the temperature sensor has a systematically higher self-heating than the electronic component. The self-heating of the temperature sensor may be higher, in particular, than the self-heating of the component in a so-called "low power mode". This is comparatively easy to achieve, in particular, if the temperature sensor is integrated into the decision logic. In this case, the thermal threshold may be ascertained directly from the temperature measurement of the internal temperature sensor of the decision logic when the system is activated.

According to another aspect of the present invention, a system is provided for carrying out the method according to the present invention. The system includes at least one electronic component and at least one decision logic for checking and for initiating an activation of the at least one electronic component, the at least one electronic component being activatable by the decision logic during a system start if operationally safe general conditions exist for the at least one electronic component. In this way, the general conditions for the safe operation of the component may be checked and ensured by the decision logic prior to an activation of the at least one electronic component. An operation of the at least one electronic component within its specification limits, in particular, may be ensured and the safety of the system enhanced.

According to one specific embodiment of the system, the decision logic is electronically connected to at least one internal temperature sensor. The decision logic may thus include an internal temperature sensor, which is directly and safely connectable. Such a decision logic may be configured, for example, as an integrated circuit or a control circuit, which triggers a mechanical or electronic relay with the aid of the temperature sensor for activating the electronic component.

According to another specific embodiment of the system, the decision logic is electronically connected to at least one external temperature sensor. Alternatively or in addition to the internal temperature sensor, the decision logic may be coupled to at least one additional external temperature sensor. The decision logic and the temperature sensors may be specified at temperatures higher than the limiting temperature of the electronic component. The limiting temperature may, for example, be at least 150° C.

Other configurations of temperature sensors may also be used. For example, the decision logic may include two or more internal temperature sensors. The decision logic may also include an access to multiple external temperature sensors. A redundant use of temperature sensors, in particular, may prevent erroneous measurements of the temperature. Multiple high quality temperature sensors, in particular, may be checked for plausibility against one another, since they are able to measure comparatively similar temperatures. An alternative or additional monitoring or safeguarding of a temperature sensor may thus also be available in the system, which prevents a redundant use of the temperature sensors.

In addition, it is advantageous if the decision logic is connected to the at least one component via a communication link and is thus able to transmit temperature values to the component.

According to another specific embodiment of the system, the decision logic is configured as an integrated circuit, a microcontroller or as a (Power Management Integrated Circuit) PMIC. In this way, the decision logic is able to carry out comprehensive regulating and checking tasks and to analyze a temperature behavior, for example.

The approach according to the present invention also includes the following advantages:
provision of a safe component-external sensor, which is formed by two redundant temperature sensors.
a decision logic, which reads in the external temperature and is able to decide whether the at least one electronic component is started.

enabling a so-called "low-power" operating mode of the electronic component, as a result of which the electronic component is able to gain access to an internal or external temperature sensor.

a thermal coupling of internal and external temperature sensors of the at least one electronic component and the decision logic adapted to one another. An external temperature sensor, in particular, may be used for safeguarding an internal temperature sensor. As a result, a safe and verifiably safe start-up of the system in all temperature scenarios is possible.

Exemplary embodiments of the present invention are explained in greater detail below with reference to highly simplified schematic representations.

BRIEF DESCRIPTION OF THE DRAWINGS

In FIG. 3 and in the specification, "Ü" stands for "Übergang"="transition", while "Z" stands for "Zustand"="state" (also referred to as "fall-back level" in the specification).

The same structural elements in the figures each have the same reference numerals.

DETAILED DESCRIPTION

Figure 1:
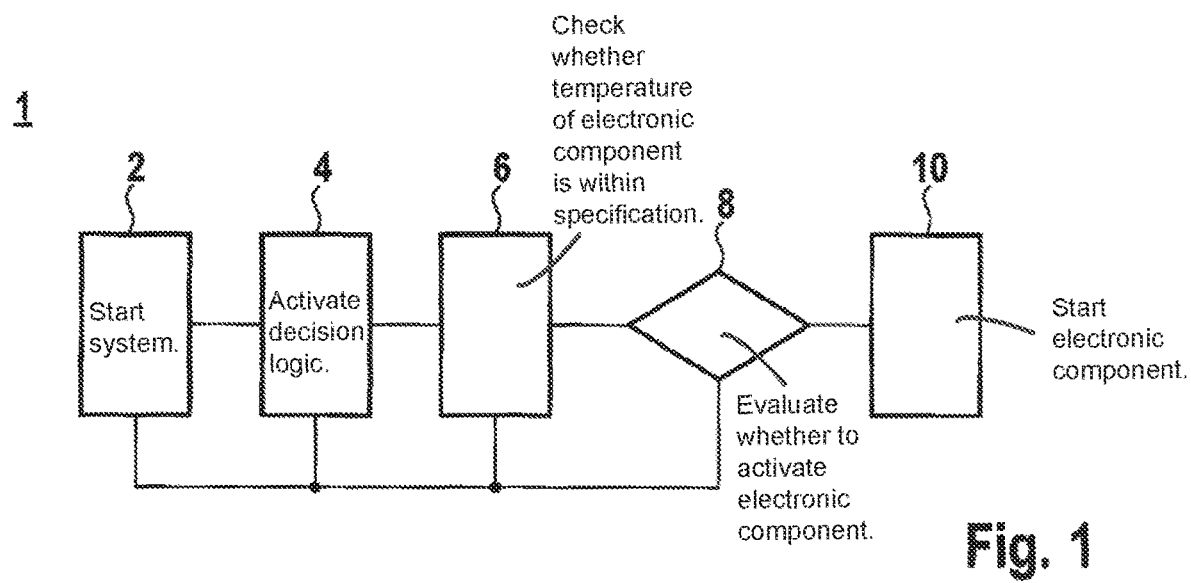
FIG. 1 schematically shows a flow chart of a method according to the present invention.

FIG. 1 schematically shows a flow chart of a method 1 according to one specific embodiment according to the present invention.

System 3 is started in a first step 2. An activation of a decision logic 5 takes place in a further step 4. Decision logic 5 subsequently carries out multiple checks 6. It is checked 6 by decision logic 5, in particular, whether the temperature of at least one electronic component 7 is within the specifications of component 7. Based on the checks of decision logic 5, an evaluation 8 of the checks is carried out. In evaluation 8, it is established by decision logic 5 whether electronic component 7 is activated or whether a step of method 2, 4, 6 is repeated. If, for example, the temperature ascertained by decision logic 5 is below a defined threshold value, then a start of electronic component 7 may be initiated 10. Otherwise, there is waiting until the general conditions for electronic component 7 are correct or an error message is generated.

During a start 2 of system 3 from thermally homogenized surroundings, the temperature, which is measured in an external temperature sensor (module tolerances), is higher than the temperature of electronic component 7 while maintaining the sequence conditions depicted in FIG. 1. In this way, the threshold may be established as a specification limit of electronic component 7 minus a tolerance and minus a maximum self-heating of electronic component 7 during the start of system 3.

Figure 2:
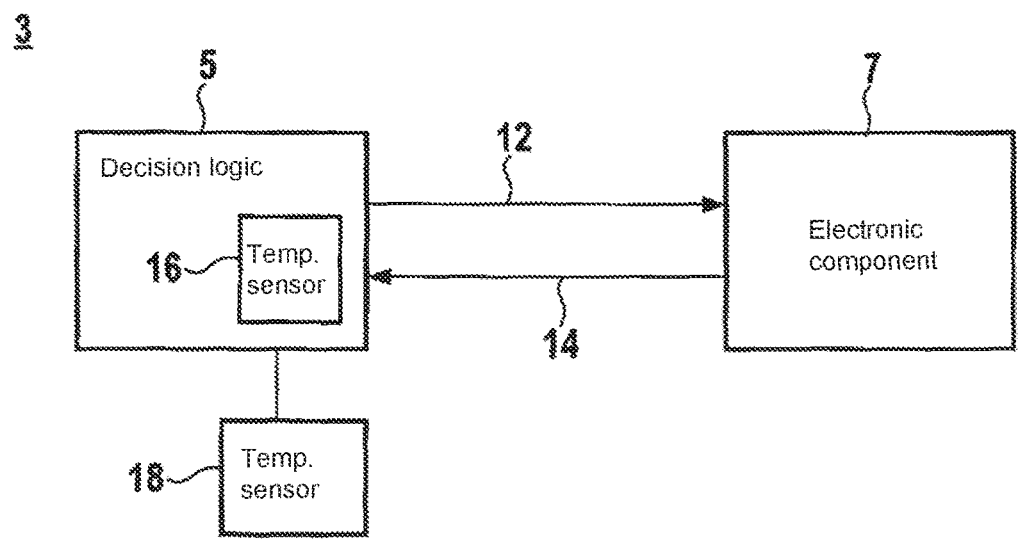
FIG. 2 schematically shows a representation of a system according to one specific embodiment according to the present invention.

FIG. 2 illustrates in a schematic representation a system 3 according to one specific embodiment according to the present invention. System 3 includes an electronic component 7, which is configured as a microprocessor or a microcontroller. Component 7 is coupled to decision logic 5 via a communication link 12. An activation link 14 is also situated between decision logic 5 and component 7, through which decision logic 5 is able to initiate an activation of electronic component 7. Communication link 12 may be used to exchange data and, in particular, temperature measurement values. Temperature values from temperature sensors 16, 18, may be conveyed via the communication link, for example, at regular intervals from decision logic 5 to component 7. Activation link 14 may, for example, be a power supply line.

Decision logic 5 includes an internal temperature sensor 16. To ensure a redundancy, decision logic 5 is coupled to an additional external temperature sensor 18. The measured values of both temperature sensors 16, 18 may be read out and evaluated by decision logic 5 or at least used for regulating.

The at least one electronic component 7 may, for example, carry out a plausibility check model of all accessible temperature values. This may be used for improving temperature estimates as well as for identifying errors. An error detected in a sensor 16, 18 is appropriately responded to by component 7. An error storage or even a transition into a safe state, for example, may be initiated.

Figure 3:
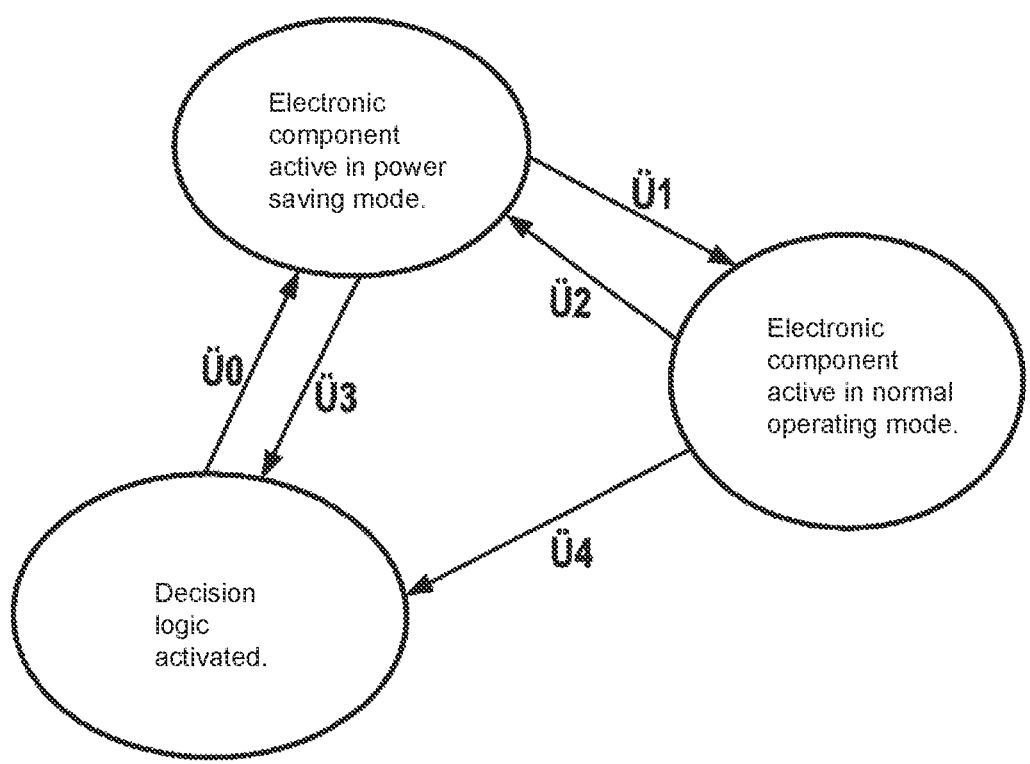
FIG. 3 shows an overview of possible states of the system and of possible transitions between the states.

FIG. 3 shows an overview of possible states of system 3 and of possible transitions between the states. Various temperature fall-back levels, in particular, are depicted.

It may be advantageous to define various temperature fall-back levels Z1, Z2, Z3 for system 3. For example, the following states or fall-back levels may be defined:

Z1: only decision logic 5 is activated;
Z2: the at least one electronic component 7 is active in a power saving mode;
Z3: the at least one electronic component 7 is in a normal operating mode.

Third state Z3 may also include additional sub-states having various power characteristics of component 7.

Transition Ü0 (from Z1 to Z2) was previously described in FIG. 1 and corresponds to activation 10 of component 7. Transition Ü1 (Z2 to Z3) normally takes place if there is no excess temperature. In addition, component 7, after reading the internal (and external) temperature values, must conclude that the normal operation is possible and that no critical temperature sensor errors are present. Alternatively, transition Ü0 may take place directly to state Z3. Transition Ü2 then takes place if it is recognized in normal mode Z3 (still within the specification) that component 7 approaches a temperature limit. Transition Ü3 then takes place if the specification limit is at risk, even in a "low power mode". In an optimally configured system 3, optional transition Ü4 should not occur. Ü4, if present, may theoretically be triggered by component 7, however, or by decision logic 5. Decision logic 5 may then trigger transition Ü4 if an excessively high temperature is detected by decision logic 5. If transitions Ü3 or Ü4 are triggered by component 7, it is advantageous if communication link 12 is usable for transmitting a signal for a high temperature shutoff. In this way, a deactivation of component 7 may be initiated indirectly via decision logic 5.

If a signal high temperature shutoff has been generated for transitions Ü3, Ü4, it is advantageous if decision logic 5 does not commence the normal start procedure again, since this procedure, due to hysteresis, may not lead to success because of the excess temperature just diagnosed. Instead, decision logic 5 may await a cooling, for example, in which a certain period of time elapses or a cooling is observed. A chronological behavior of the temperature may be easily implemented via a timer.

The following approach may be advantageous in this case:

decision logic 5 stores the internal value of temperature sensor 16, 18 when receiving the signal high temperature shutoff via communication link 12 decision logic 5 establishes a threshold based on this stored value (for example, 3 K lower), as of which a restart of component 7 is possible the EL checks whether this threshold is fallen below. Once the threshold is fallen below, the normal start procedure takes place or method 1 is carried out again.

What is claimed is:

1. A method for providing operationally safe activation of at least one electronic component in a system, the method comprising:
    initiating a start process of the system;
    activating a decision logic;
    reading out at least one temperature sensor while the at least one electronic component is in a deactivated state;
    performing a check by the decision logic based on a measured temperature of the at least one temperature sensor, whether the at least one electronic component is activatable in an operationally safe manner; and
    initiating an activation, from the deactivated state, of the at least one electronic component by the decision logic, in response to determining that the temperature measured by the at least one temperature sensor is below a threshold value.

2. The method of claim 1, wherein when the threshold value of the measured temperature of the at least one temperature sensor is exceeded, the activation of the at least one electronic component is suspended by the decision logic until the measured temperature is below the threshold value.

3. The method of claim 1, wherein a self-test is carried out by the decision logic.

4. The method of claim 1, wherein an electronic test of the at least one electronic component is carried out by the decision logic.

5. The method of claim 1, wherein the decision logic checks whether the at least one temperature sensor exhibits an error.

6. The method of claim 5, wherein a restart of the system is initiated by the decision logic or an error message is generated when the error of the at least one temperature sensor is detected by the decision logic.

7. The method of claim 1, wherein the at least one electronic component is activated by the decision logic in a power saving mode when a first threshold value of the measured temperature is exceeded and a second threshold value of the measured temperature is fallen below.

8. The method of claim 1, wherein a self-heating of the at least one electronic component is taken into consideration by the decision logic when carrying out the check.

9. The method of claim 1, wherein the at least one electronic component is a control unit.

10. The method of claim 1, wherein the at least one electronic component is a video control unit.

11. A system, comprising:
    at least one electronic component and at least one decision logic for checking and for initiating an activation of the at least one electronic component;
    wherein the at least one electronic component is activatable by the decision logic during a system start when an operationally safe general condition for the at least one electronic component exists, and
    wherein the at least one electronic component and the at least one decision logic are configured to perform the following:
    initiating a start process;
    activating the decision logic;
    reading out at least one temperature sensor while the at least one electronic component is in a deactivated state;
    performing a check by the decision logic based on a measured temperature of the at least one temperature sensor, whether the at least one electronic component is activatable in an operationally safe manner; and
    initiating the activation, from the deactivated state, of the at least one electronic component by the decision logic in response to determining that the temperature measured by the at least one temperature sensor is below a threshold value.

12. The system of claim 11, wherein the at least one temperature sensor includes at least one internal temperature sensor.

13. The system of claim 11, wherein the decision logic is electronically connected to at least one external temperature sensor.

14. The system of claim 11, wherein the decision logic is configured as an integrated circuit, a microcontroller or a Power Management Integrated Circuit (PMIC).

* * * * *